(12) United States Patent
Wang et al.

(10) Patent No.: US 11,919,403 B2
(45) Date of Patent: Mar. 5, 2024

(54) BATTERY COMPARTMENT AND HANDLE FOR USE IN TRANSPORTATION VEHICLE

(71) Applicant: BOE TECHNOLOGY GROUP CO., LTD., Beijing (CN)

(72) Inventors: Zifeng Wang, Bejing (CN); Yunpeng Wu, Bejing (CN); Yan Ren, Bejing (CN); Lei Cao, Bejing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 461 days.

(21) Appl. No.: 17/256,288

(22) PCT Filed: Dec. 12, 2019

(86) PCT No.: PCT/CN2019/124837
§ 371 (c)(1),
(2) Date: Dec. 28, 2020

(87) PCT Pub. No.: WO2021/114174
PCT Pub. Date: Jun. 17, 2021

(65) Prior Publication Data
US 2021/0362609 A1 Nov. 25, 2021

(51) Int. Cl.
*H01R 3/00* (2006.01)
*B60L 50/60* (2019.01)
*H01M 50/102* (2021.01)

(52) U.S. Cl.
CPC ........... *B60L 50/60* (2019.02); *H01M 50/102* (2021.01); *H01M 2220/00* (2013.01)

(58) Field of Classification Search
CPC .. H01M 50/102; H01M 2220/00; H01M 2/20; H01M 2/1055; H01R 13/2442
See application file for complete search history.

(56) References Cited

U.S. PATENT DOCUMENTS 8,721,368 B2 * 5/2014 Zhao ................... H01M 50/526
439/627
10,044,126 B2 * 8/2018 Krebs .................. H01R 11/288
(Continued)

FOREIGN PATENT DOCUMENTS

CN 201165206 Y 12/2008
CN 201435317 Y 3/2010
(Continued)

OTHER PUBLICATIONS

Extended European search report of counterpart European application No. 19950230.3 dated Jan. 20, 2023.
(Continued)

*Primary Examiner* — Phuong Chi Thi Nguyen
(74) *Attorney, Agent, or Firm* — Lippes Mathias LLP (57) ABSTRACT

The present disclosure provides a battery compartment and a handle for use in a transportation vehicle. The battery compartment includes: a battery mount having at least two battery mounting grooves spaced apart from each other; a connection electrode on the battery mount and between adjacent battery mounting grooves; a battery compartment cover detachably connected to the connection electrode; and a pushing-out assembly on the connection electrode, wherein the pushing-out assembly is configured to provide a force for moving the battery compartment cover away from the connection electrode.

19 Claims, 8 Drawing Sheets

(56) References Cited

U.S. PATENT DOCUMENTS

| | | | |
|---|---|---|---|
| 10,122,006 B2 * | 11/2018 | Matsumura | H01G 11/76 |
| 2012/0040226 A1 * | 2/2012 | Kim | H01M 50/264 |
| | | | 429/158 |
| 2018/0105062 A1 | 4/2018 | Fees et al. | |

FOREIGN PATENT DOCUMENTS

| | | |
|---|---|---|
| CN | 101820083 A | 9/2010 |
| CN | 201947008 U | 8/2011 |
| CN | 205921005 U | 2/2017 |
| CN | 109854087 A | 6/2019 |
| CN | 209217063 U | 8/2019 |
| CN | 110212126 A | 9/2019 |
| CN | 209607318 U | 11/2019 |
| CN | 209766502 U | 12/2019 |
| EP | 3567650 A1 | 11/2019 |
| JP | S5848351 A | 3/1983 |
| JP | 2000196257 A | 7/2000 |
| TW | 1525262 B | 3/2016 |

OTHER PUBLICATIONS

Examination report of counterpart Indian application No. 202147050990 dated Aug. 17, 2022.

International search report of PCT application No. PCT/CN2019/124837 dated Jul. 28, 2020.

* cited by examiner

BATTERY COMPARTMENT AND HANDLE FOR USE IN TRANSPORTATION VEHICLE

CROSS-REFERENCE TO RELATED APPLICATIONS

This Application is a 371 of PCT Application No. PCT/CN2019/124837 filed on Dec. 12, 2019, the entire contents of which are incorporated herein by reference.

TECHNICAL FIELD

The present disclosure relates to the field of battery technologies, and more particularly to a battery compartment and a handle for use in a transportation vehicle.

BACKGROUND

With the development of science and technology, handles in more and more public transportation vehicles such as buses and subways are provided with electronic ink screens to display information such as advertisements. Such electronic ink screens have the characteristics of low power consumption and convenience in content replacement, and thus are widely applied to the handles. The electronic ink screens on the handles are generally powered by a battery. While being installed, the battery is put into a battery compartment of the handle after passing through a mounting slot of the handle. After the battery is installed, the battery compartment cover is installed in the mounting slot of the handle to keep the battery fixed in the battery compartment, thereby preventing the battery from dropping out of the battery compartment.

SUMMARY

The embodiments of the present disclosure provide a battery compartment and a handle for use in a transportation vehicle. The technical solutions are as follows.

An embodiment of the present disclosure provides a battery compartment. The battery compartment includes: a battery mount having at least two battery mounting grooves spaced apart from each other; a connection electrode on the battery mount and between adjacent battery mounting grooves; a battery compartment cover detachably connected to the connection electrode; and a pushing-out assembly on the connection electrode, wherein the pushing-out assembly is configured to provide a force for moving the battery compartment cover away from the connection electrode.

In an implementation of the embodiment of the present disclosure, the connection electrode is provided with a slide slot, and the pushing-out assembly includes a pushing-out member in the slide slot and a slider configured to slidably engage with the slide slot, wherein the pushing-out member is configured to provide the slider a force for moving the slider away from a bottom of the slide slot, so as to enable at least a portion of the slider to extend out of the slide slot.

In another implementation of the embodiment of the present disclosure, the pushing-out member is an elastic member, and the elastic member is located between the bottom of the slide slot and the slider.

In another implementation of the embodiment of the present disclosure, the pushing-out member includes a first magnetic member at the bottom of the slide slot and a second magnetic member on the slider, wherein magnetic poles of the first magnetic member and the second magnetic member facing each other have a same polarity.

In another implementation of the embodiment of the present disclosure, the connection electrode is provided with a threaded hole, and the battery compartment cover is detachably connected to the connection electrode by a screw engaged with the threaded hole.

In another implementation of the embodiment of the present disclosure, the threaded hole is at the bottom of the slide slot, and the slider is provided with a through hole coaxial with the threaded hole, and the screw passes through the through hole to engage with the threaded hole at the bottom of the slide slot.

In another implementation of the embodiment of the present disclosure, the threaded hole is in an end surface of the connection electrode, wherein the end surface is a surface of the connection electrode facing away from the battery mount.

In another implementation of the embodiment of the present disclosure, the threaded hole is a through hole, and the screw passes through the threaded hole to abut against the slider; or, the threaded hole is a blind hole.

In another implementation of the embodiment of the present disclosure, inner wall of the slide slot is provided with internal threads; an end of the slider proximal to the battery mount is slidably inserted into the slide slot, and an end of the slider distal from the battery mount is provided with external threads mating with the internal threads; and the slider is provided with a threaded hole, and the battery compartment cover is fixed onto the slider by a screw engaged with the threaded hole.

In another implementation of the embodiment of the present disclosure, a narrow portion having a reduced diameter is in a middle portion of a threaded rod of the screw, wherein the narrow portion is contained in an mounting hole of the battery compartment cover which is configured for the screw to pass through, and a diameter of the mounting hole being smaller than a diameter of the threaded rod.

In another implementation of the embodiment of the present disclosure, the battery compartment cover includes two separate cover plates, wherein each of the two separate cover plates is provided with a recess, and the mounting hole is formed from the two recesses when the two separate cover plates are combined.

In another implementation of the embodiment of the present disclosure, the connection electrode is in a cylindrical shape and has a closed end and an open end opposite to each other, wherein the closed end is located on the battery mount and the open end faces the battery compartment cover, and an inner cavity of the connection electrode constitutes the slide slot.

In another implementation of the embodiment of the present disclosure, a slider stopper plate is provided at the open end of the connection electrode.

In another implementation of the embodiment of the present disclosure, the pushing-out member is a spring with one end abutting against the bottom of the slide slot and the other end abutting against the slider; the connection electrode is in a cylindrical shape and has a closed end and an open end opposite to each other, wherein the closed end is located on the battery mount and an open end faces the battery compartment cover, an inner cavity of the connection electrode constitutes the slide slot, and a slider stopper plate is provided at the open end of the connection electrode; the slider includes a body and a protrusion protruding axially from a side surface of the body, wherein the body is inside the slide slot, and the protrusion is outside the slide slot and axially extends out of the slider stopper plate; and a threaded hole is provided in a middle of the bottom of the slide slot;

the slider is provided with a through hole coaxial with the threaded hole; the battery compartment cover is detachably connected to the connection electrode by a screw engaged with the threaded hole; and the screw sequentially passes through the through hole and the through hole of the spring to engage with the threaded hole.

The embodiments of the present disclosure provide a handle for use in a transportation vehicle. The handle includes the aforesaid battery compartment.

In another implementation of the embodiment of the present disclosure, the handle includes a casing provided with a mounting slot, wherein the battery mount is located in the mounting slot, the battery compartment cover fits into an opening of the mounting slot, and a surface where the battery compartment cover fits into the opening of the mounting slot is an inclined surface.

In another implementation of the embodiment of the present disclosure, the casing includes a side connection plate and two flat plates facing each other in parallel, wherein each of the two flat plates is provided with a grip hole, and the side connection plate is configured to connect outer edges of the two flat plates and connect inner edges of the two grip holes.

In another implementation of the embodiment of the present disclosure, the mounting slot penetrates the side connection plate that is connected to inner edges of the two grip holes.

In another implementation of the embodiment of the present disclosure, the handle further includes a display screen, wherein at least one of the two flat plates is provided with the display screen, and the display screen is electrically connected to the battery compartment.

DETAILED DESCRIPTION

In order to make the objects, technical solutions and advantages of the present disclosure clearer, the embodiments of the present disclosure will be described in detail below with reference to the accompanying drawings.

Transportation vehicles are an indispensable part of people's lives. With the advancement in science and technology, more and more transportation vehicles emerge, bringing great convenience to everyone's life. As the public transportation vehicles cannot provide seats for every passenger when there are too many passengers, hand-holding handles are usually provided on the public transportation vehicles for standing passengers to ensure the ride experience.

In some public transportation vehicles, the handles are provided with electronic ink screens for displaying information such as advertisements, so as to facilitate the passengers to obtain relevant information.

In the related art, the electronic ink screens on the handles are generally powered by batteries. Thus, a battery compartment needs to be provided in a casing of the handle to install the battery, and the casing may be further provided with a mounting slot through which the battery is installed into the battery compartment. After the battery is installed, the mounting slot needs to be covered by the battery compartment cover to prevent the battery from dropping out of the battery compartment. Generally, the battery compartment cover is fixed inside the mounting slot by a screw.

After such electronic ink screens are used for a period of time, it is necessary to replace the battery by detaching the battery compartment cover, at this time, the screws needs to be unscrewed to cause the battery compartment cover to drop out of the mounting groove by virtue of gravity, and then the battery can be replaced.

However, as the mounting slot on the handle has a similar size with the battery compartment cover, when removing the battery compartment cover which has been installed in the mounting slot, the battery compartment cover often gets stuck in the mounting slot. Moreover, since the battery compartment cover per se has a light weight, it may be difficult for the battery compartment cover to drop out of the mounting slot merely by virtue of the gravity, which causes inconvenience in detaching the battery compartment cover.

Figure 1:
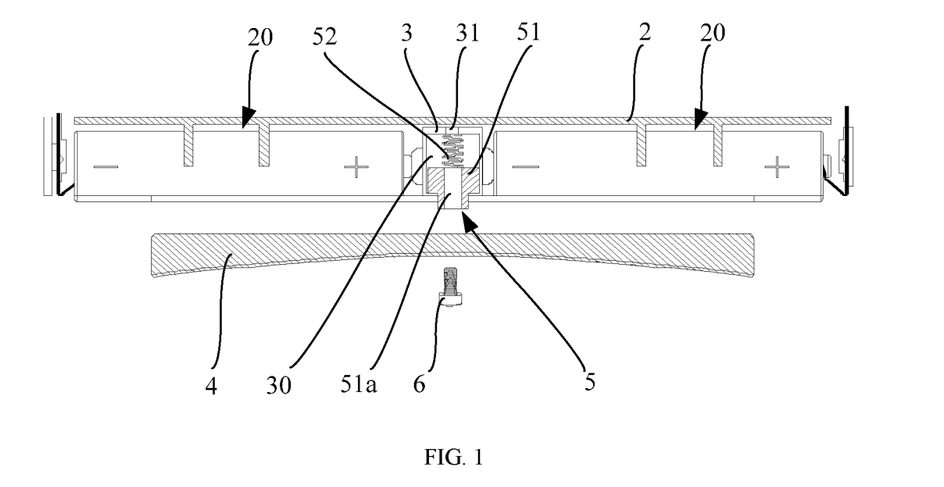
FIG. 1 is a schematic diagram of a structure of a battery compartment according to an embodiment of the present disclosure.

FIG. 1 is a schematic diagram of a structure of a battery compartment according to an embodiment of the present disclosure. As shown in FIG. 1, the battery compartment includes a battery mount 2, a connection electrode 3, a battery compartment cover 4, and a pushing-out assembly 5. The battery mount has at least two battery mounting grooves 20 spaced apart from each other. The connection electrode 3 is located on the battery mount 2 and between adjacent battery mounting grooves 20. The battery compartment cover 4 is detachably connected to the connection electrode 3, and the pushing-out assembly 5 is located on the connection electrode 3. The pushing-out assembly 5 is configured to provide a force on the battery compartment cover 4 for moving it away from the connection electrode 3.

The connection electrode is a conductive structure connecting the positive and negative electrodes of two batteries. Generally, the connection electrode is provided between the electrodes of two batteries, such that a positive electrode of one battery is electrically connected to a negative electrode of the other battery.

In the embodiment of the present disclosure, a plurality of battery mounting grooves are provided on the battery mount, and a connection electrode is fixedly provided between two adjacent battery mounting grooves. The pushing-out assembly is installed on the connection electrode, and the battery compartment cover is detachably connected to the connection electrode. Since the pushing-out assembly may provide a force on the battery compartment cover for moving it away from the connection electrode, the pushing-out assembly may help to separate the battery compartment cover from the connection electrode when the battery compartment cover is to be detached from the connection electrode, such that the battery compartment cover is moving away from the connection electrode and ejected from the mounting groove, thereby facilitating a technician to take out the battery compartment cover from the mounting groove.

Optionally, the battery mount 2 may be of a flat plate structure, and the battery mounting groove disposed thereon may be a groove having a same shape as the battery. For example, if the battery is a cylindrical battery, the battery mounting groove may be an arc-shaped groove disposed on the battery mount which has a flat plate shape.

Optionally, the battery mount 2 may include a bottom plate and a support plate disposed on the bottom plate in the vertical direction, and the support plate is provided with a groove that has a shape matching that of the battery (namely, the battery mounting groove).

It should be noted that FIG. 1 merely exemplifies two battery mounting grooves. In other embodiments, the number of battery mounting grooves may be determined according to actual needs, which is not limited in the present disclosure.

Optionally, as shown in FIG. 1, the connection electrode 3 is provided with a slide slot 30. The pushing-out assembly 5 includes a slider 51 configured to slidably engage with the slide slot 30 and a pushing-out member. The pushing-out member is located inside the slide slot 30 and configured to provide a force for moving the slider 51 away from a bottom of the slide slot 30. The pushing-out member provides a force on the slider 51 for moving it away from the bottom of the slide slot 30, such that at least a portion of the slider 51 can extend out of the slide slot 30 of the connection electrode 3 by sliding the slider 51 in the slide slot 30.

In the embodiment of the present disclosure, when the battery compartment is in a closed state, the battery compartment cover 4 is connected to the connection electrode 3. At this time, the battery compartment cover 4 abuts against the slider 51, and when the battery compartment cover 4 is detached from the connection electrode 3, the pushing-out member can drive the slider 51 to move in the slide slot 30, thereby pushing the slider 51 away from the bottom of the slide slot 30, and the portion of the slider 51 which is capable of extending out of the slide slot 30 can push the battery compartment cover 4 to separate from the connection electrode 3, so as to realize the purpose that the slider 51 pushes the battery compartment cover 4 to move and then ejects the battery compartment cover 4, thereby making it convenient for the technician to take out the battery compartment cover 4 from the mounting groove.

Figure 2:
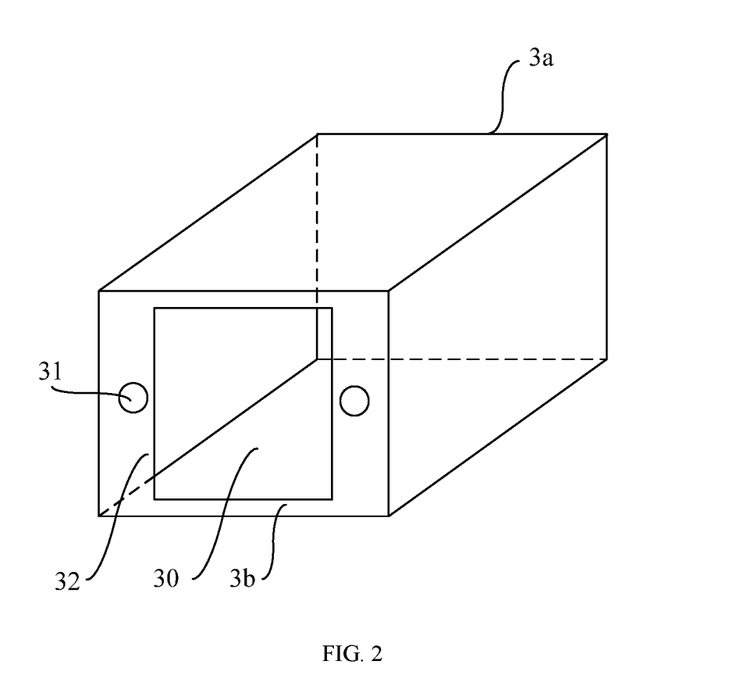
FIG. 2 is a schematic diagram of a structure of a connection electrode according to an embodiment of the present disclosure.

FIG. 2 is a schematic diagram of a structure of a connection electrode according to an embodiment of the present disclosure. As shown in FIG. 2, the connection electrode 3 is in a cylindrical shape, which means that the connection electrode 3 may be a conductive cylinder; and the connection electrode 3 has a closed end 3a and an open end 3b opposite to each other. The closed end 3a is located on the battery mount 2, the open end 3b faces the battery compartment cover 4, and an inner cavity of the connection electrode 3 constitutes the slide slot 30. The slider 51 and the pushing-out member are both disposed in the inner cavity of the connection electrode 3, and the slider 51 is disposed slidably in the inner cavity of the connection electrode 3.

Exemplarily, the cylinder may be a circular cylinder or a square cylinder. When the cylinder is a square cylinder, the inner cavity may be a rectangular columnar space or a cylindrical space. When the cylinder is a circular cylinder, the inner cavity may be a rectangular columnar space or a cylindrical space.

The specific shape of the cylinder and the shape of the inner cavity space can be designed according to requirements, which is not limited in this embodiment.

Figure 3:
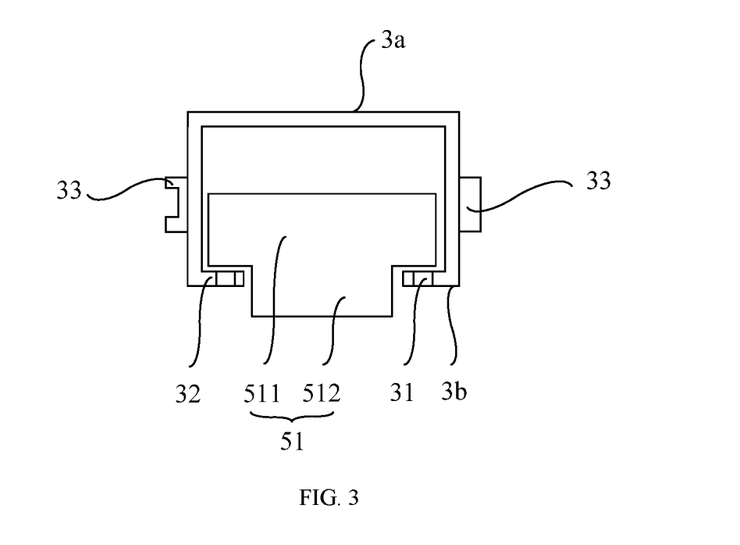
FIG. 3 is a schematic diagram of an engagement between a connection electrode and a slider according to an embodiment of the present disclosure.

FIG. 3 is a schematic diagram of an engagement between a connection electrode and a slider according to an embodiment of the present disclosure. In conjunction with FIG. 2 and FIG. 3, a slider stopper plate 32 may be provided at the open end 3b of the connection electrode 3. For example, the slider stopper plate 32 may be an inner flange extending from the inner wall of the connection electrode 3 to the middle of the slide slot.

The axial cross-section of the slider 51 may be T-shaped, that is, the slider 51 may include a body 511 and a protrusion 512 protruding axially from a side surface of the body. The protrusion 512 may protrude out of the inner cavity of the connection electrode 3, and the body 511 of the slider 51 can be limited in the inner cavity under the locking of the slider stopper plate 32, so that the slider 51 can be prevented from dropping out of the connection electrode 3. The shape of the body 511 matches with the shape of the inner cavity of the connection electrode 3.

Optionally, as shown in FIG. 3, a connection block 33 is provided on an outer wall of the connection electrode 3. The connection block 33 is configured to contact the positive or negative electrode of the battery with the connection electrode 3. The side surface of the connection block 33 in contact with the positive or negative electrode of the battery may have a same shape with the positive or negative electrode of the battery to increase the contact area between the connection block 33 and the battery, thereby making the electrical connection between the battery and the connection electrode 3 more stable.

For example, in a case that the connection block 33 is connected to the negative electrode of the battery, when the negative electrode of the battery has a flat surface, the side surface of the connection block 33 in contact with the negative electrode of the battery may be flat, thereby facilitating the fit between the connection block 33 and the negative electrode of the battery.

For example, in a case that the connection block 33 is connected to the positive electrode of the battery, when the positive electrode of the battery is a cylindrical protrusion, the side surface of the connection block in contact with the positive electrode of the battery may be a surface of cylindrical groove, thereby facilitating the fit between the connection block 33 and the positive electrode of the battery. Alternatively, in a case that the connection block 33 is connected to the positive electrode of the battery and the positive electrode of the battery is a cylindrical protrusion, the side surface of the connection block in contact with the positive electrode of the battery can be flat, as long as the connection block 33 is in contact with the positive electrode of the battery.

In an implementation of the present disclosure, as shown in FIG. 1, the pushing-out member is an elastic member 52, and the elastic member 52 is located between the slider 51 and the bottom of the slide slot 30. When the battery compartment cover 4 is connected to the connection electrode 3, the slider 51 is sandwiched between the battery compartment cover 4 and the elastic member 52, and the elastic member 52 is in a compressed state. That is, the battery compartment cover 4 abuts against the slider 51 and compresses the elastic member 52 at this point. Thus, the elastic force of the elastic member 52 is released after the battery compartment cover 4 is detached from the connection electrode 3, and the battery compartment cover 4 is ejected from the mounting groove by the slider 51.

Exemplarily, the elastic member 52 may be a spring, a highly elastic rubber pad, or the like.

In order to realize the detachable connection between the battery compartment cover 4 and the connection electrode 3, in an optional implementation, the connection electrode 3 is provided with a threaded hole 31, such that the battery compartment cover 4 is detachably connected to the connection electrode 3 by a screw 6 engaged with the threaded hole 31. That is, the battery compartment cover 4 is connected to the connection electrode 3 by the screw 6. The threaded connection facilitates rapid fixing of the battery compartment cover 4 onto the connection electrode 3.

It should be noted that the battery compartment cover 4 may be connected to the connection electrode 3 by a variety of connection manners such as conical pin connection, which is not limited in this embodiment.

Optionally, the threaded hole 31 may be located at the bottom of the slide slot 30 of the connection electrode 3, the end surface of the connection electrode 3, or the like.

Exemplarily, as shown in FIG. 1, the threaded hole 31 is disposed at the bottom of the slide slot 30; the slider 51 is provided with a through hole 51a coaxial with the threaded hole 31; and the screw 6 passes through the through hole 51a to engage with the threaded hole 23 at the bottom of the slide slot 30. That is, the battery compartment cover 4 is connected to the connection electrode 3 by the screw 6 passing through the through hole 51a.

In the embodiment shown in FIG. 1, the threaded hole 31 is in the middle of the bottom of the slide slot 30, and accordingly, the through hole 51a is in the middle of the slider 51. The elastic member 52 is a spring, and the spring abuts against the middle of the slider 51 to facilitate the spring to uniformly deliver the elastic force to the slider 51. Therefore, the screw 6 passes through the through hole of the spring after passing through the through hole 51a in the middle of the slider 51, and is then engaged with the threaded hole 31 at the bottom of the slide slot 30 after passing through the through hole of the spring, such that after the screw 6 is screwed into the threaded hole 31, the battery compartment cover 4 abuts against the slider 51 and compresses the spring.

Figure 4:
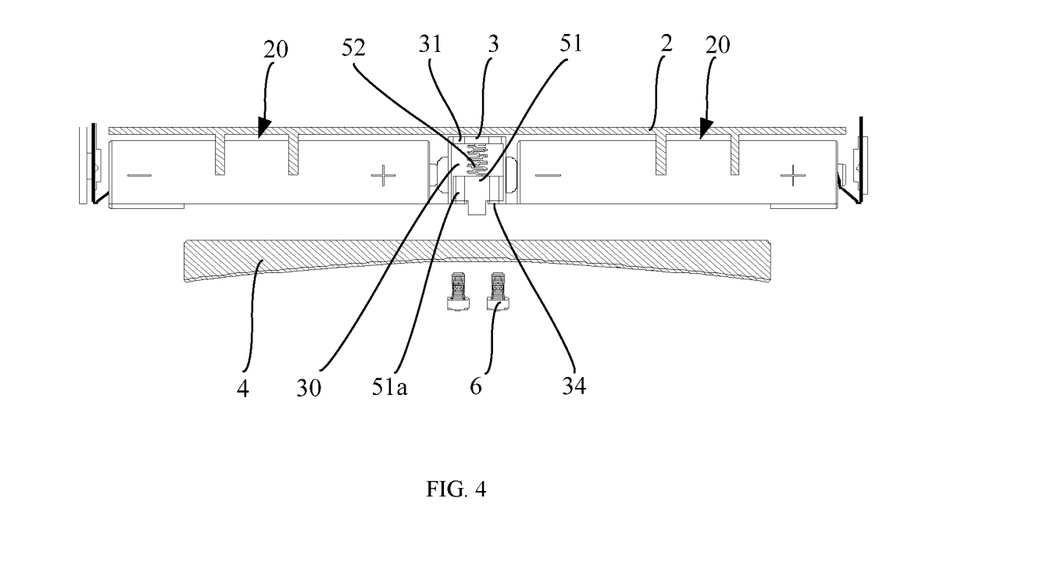
FIG. 4 is a schematic diagram of a structure of another battery compartment according to an embodiment of the present disclosure.

FIG. 4 is a schematic diagram of a structure of another battery compartment according to an embodiment of the present disclosure. The structures shown in FIG. 4 and FIG. 1 are substantially the same, and their difference merely lies in that the threaded hole 31 in the embodiment shown in FIG. 1 is in the middle of the bottom of the slide slot 30, whereas the threaded hole 31 in the embodiment shown in FIG. 4 is at the edge of the bottom of the slide slot 30.

As shown in FIG. 4, when the threaded hole 31 is at the edge of the bottom of the slide slot 30, for the connection electrode 3 having a slider stopper plate 32 at the open end 3b, the threaded hole 31 at the bottom of the slide slot 30 faces the slider stopper plate 32, such that a connection hole 34 coaxial with the threaded hole 31 may be provided in the end surface (that is, the slider stopper plate 32) of the connection electrode 3 to facilitate engagement of the screw 6 to the threaded hole 31. The end surface is a surface of the connection electrode 3 facing away from the battery mount 2.

Exemplarily, as shown in FIG. 4, the threaded hole 31 is at the bottom of the slide slot 30, and the slider stopper plate 32 of the connection electrode 3 is provided with a connection hole 34 coaxial with the threaded hole 31. Here, the screw 6 is engaged with the threaded hole 23 at the bottom of the slide slot 30 by sequentially passing through the connection hole 34 of the connection electrode 3 and the through hole 51a. The connection hole 34 may be an unthreaded hole or a threaded hole.

In the embodiment shown in FIG. 4, the threaded holes 31 are distributed at both sides of the bottom of the slide slot 30, and the through hole 51a and the connection hole 34 are coaxial with the threaded hole 31. In other words, the through holes 51a are distributed at both sides of the slider 51, and the connection holes 34 are in the slider stopper plate 32 of the connection electrode 3. The elastic member 52 is a spring, and the spring abuts against the middle of the slider 51 to facilitate the spring to uniformly deliver the elastic force to the slider 51. Therefore, each of the screws 6 is engaged with the threaded hole 31 at a side of the bottom of the slide slot 30 after passing through the connection hole 34 and the through hole 51a of the slider 51, such that after the screw 6 is screwed tightly into the threaded hole 31, the battery compartment cover 4 can abut against the slider 51 and compress the spring.

In this embodiment, when the threaded holes 31 are distributed at both sides of the bottom of the slide slot 30, there may be a plurality of (i.e., at least two) threaded holes 31. By providing a plurality of threaded holes 31 to engage with the screws 6, the connection reliability between the battery compartment cover 4 and the connection electrode 3 can be improved.

Exemplarily, when the threaded hole 31 is provided at the edge of the bottom of the slide slot 30, the plurality of threaded holes 31 may also be arranged at intervals circumferentially around the central axis of the connection electrode 3. Accordingly, the through holes 51a in the slider 51 may also be arranged at intervals circumferentially around the central axis of the slider 51. In addition, when the connection electrode 3 is further provided with the slider stopper plate 32, the connection holes 34 in the slider stopper plate 32 may also be arranged at intervals circumferentially around the central axis of the connection electrode 3.

Figure 5:
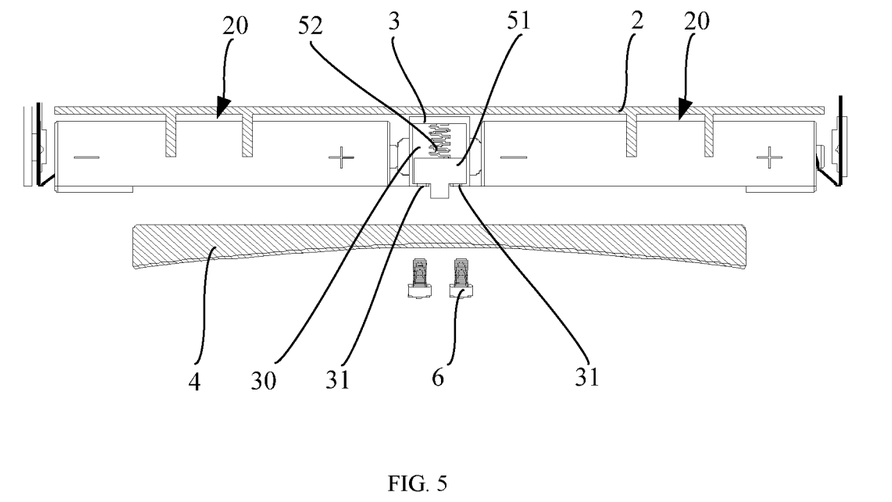
FIG. 5 is a schematic diagram of a structure of still another battery compartment according to an embodiment of the present disclosure.

FIG. 5 is a schematic diagram of a structure of still another battery compartment according to an embodiment of the present disclosure. The embodiment shown in FIG. 5 differs from the embodiments shown in FIG. 1 and FIG. 4 in that the threaded hole 31 may also be in the end surface of the connection electrode 3, wherein the end surface is a surface of the connection electrode 3 facing away from the battery mount 2.

For the connection electrode 3 having the slider stopper plate 32 at the open end 3b, the threaded hole 31 in the end surface of the connection electrode 3 may be located in the slider stopper plate 32.

Exemplarily, as shown in FIG. 5, the slider stopper plate 32 is provided with the threaded holes 31 that are in communication with the slide slot 30. That is, the threaded hole 31 is a through hole, and the screw 6 passes through the threaded hole 31 to abut against the slider 51. The elastic member 52 is a spring, and the spring abuts against the middle of the slider 51 to facilitate the spring to uniformly deliver the elastic force to the slider 51. Since the threaded hole 31 is disposed in the slider stopper plate 32 of the connection electrode 3 and the slider 51 engaged with the connection electrode 3 has a T-shaped axial cross-section, as the screw 6 is being screwed into the threaded hole 31, the screw 6 can further abut against the slider 51 behind the slider stopper plate 32 to move toward the battery mount 2. That is, the screw 6 abuts against the slider 51 and compresses the spring together with the battery compartment cover 4.

Figure 6:
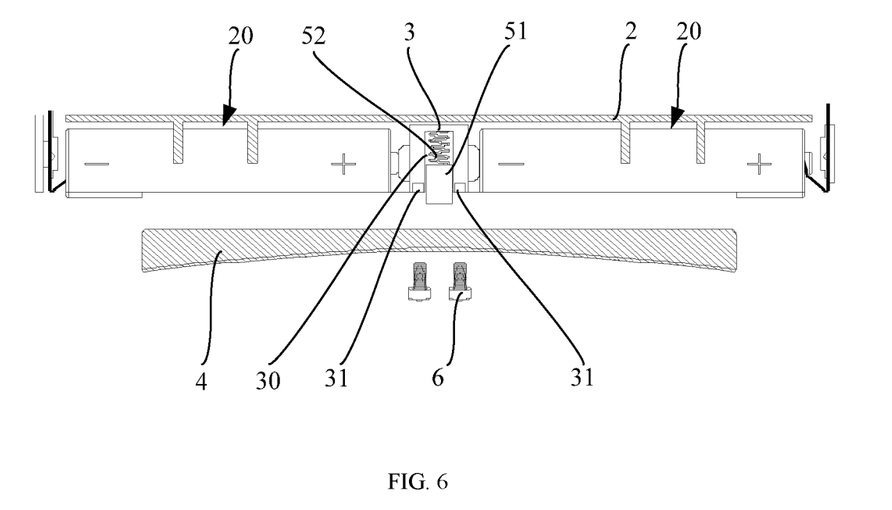
FIG. 6 is a schematic diagram of a structure of still another battery compartment according to an embodiment of the present disclosure.

FIG. 6 is a schematic diagram of a structure of still another battery compartment according to an embodiment of the present disclosure. As shown in FIG. 6, the threaded holes 31 are located in the end surface of the connection electrode 3, and the threaded hole 31 is a blind hole. That is, the threaded holes 31 are not in communication with the slide slot 30. In other words, at this point, there is no slider 51 behind the end surface of the connection electrode 3 facing away from the battery mount 2, and the screw 6 would not abut against any slider 51 as when being screwed into the threaded hole 31. In this case, the screw 6 is only used to fix the battery compartment cover 4 onto the connection electrode 3, and the battery compartment cover 4 may abut against the slider 51 to compress the spring after being fixed onto the connection electrode 3.

In this embodiment, the number of the threaded holes 31 on the battery compartment cover 4 may be determined based on the strength requirement of the locking. For example, when the strength requirement of the locking is not high, one threaded hole 31 may be provided in the battery compartment cover 4 to facilitate the rapid detachment of the battery compartment cover 4 (see FIG. 1); and when the strength requirement of the locking is high, i.e., it is required that the battery compartment cover 4 would not be loosen easily after being connected to the threaded hole 31, two or more threaded holes 31 may be provided in the battery compartment cover 4 (see FIG. 4, FIG. 5, and FIG. 6).

Figure 7:
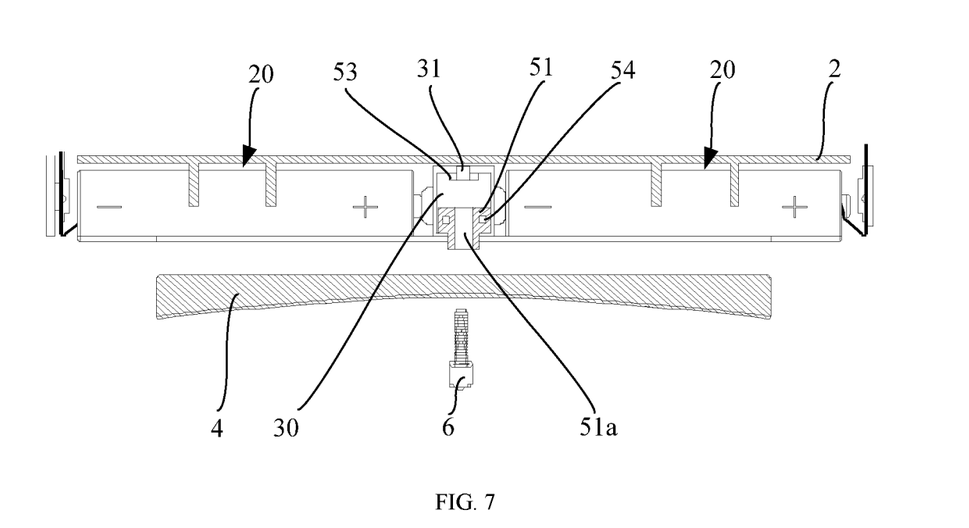
FIG. 7 is a schematic diagram of a structure of still another battery compartment according to an embodiment of the present disclosure.

FIG. 7 is a schematic diagram of a structure of still another battery compartment according to an embodiment of the present disclosure. The structures of the battery compartment shown in FIG. 7 and FIG. 1 are similar, and their difference merely lies in that the pushing-out member of the battery compartment in FIG. 1 is an elastic member, whereas the pushing-out member of the battery compartment shown in FIG. 7 includes a magnetic member.

As shown in FIG. 7, the pushing-out member includes a first magnetic member 53 at the bottom of the slide slot 30 and a second magnetic member 54 on the slider 51, wherein magnetic poles of the first magnetic member 53 and the second magnetic member 54 facing each other have a same polarity. When the battery compartment cover 4 is connected to the connection electrode 3, the battery compartment cover 4 abuts against the slider 51, such that the slider 51 gets closer to the first magnetic member 53. In addition, when the battery compartment cover 4 is connected to the connection electrode 3, the slider 51 pushes the second magnetic member 54 to approach the first magnetic member 53, and magnetic forces repelling each other are generated between the first magnetic member 53 and the second magnetic member 54. Thus, after the battery compartment cover 4 is detached from the connection electrode 3, the battery compartment cover 4 will be ejected from the mounting groove by the slider 51 under the action of the magnetic forces repelling each other between the first magnetic member 53 and the second magnetic member 54.

Exemplarily, the first magnetic member 53 and the second magnetic member 54 may be magnetic substances, for example, magnets or the like. The first magnetic member 53 may be provided at the bottom of the slide slot 30, and the second magnetic member 54 may be embedded in the slider 51, or the slider 51 may be prepared from a magnetic material.

In order to realize the detachable connection between the battery compartment cover 4 and the connection electrode 3, in an optional implementation, the connection electrode 3 is provided with a threaded hole 31, such that the battery compartment cover 4 is detachably connected to the connection electrode 3 by a screw 6 engaged with the threaded hole 31. That is, the battery compartment cover 4 is connected to the connection electrode 3 by the screw 6. The threaded connection facilitates rapid fixing of the battery compartment cover 4 onto the connection electrode 3.

It should be noted that the battery compartment cover 4 may be connected to the connection electrode 3 by a variety of connection manners such as conical pin connection, which is not limited in this embodiment.

When the pushing-out member includes the first magnetic member 53 and the second magnetic member 54, distribution position of the threaded hole 31 may be same as the distribution position of the threaded hole 31 when the pushing-out member is the elastic member 52. That is, the threaded hole 31 may be located at the bottom of the slide slot 30 of the connection electrode 3, the end surface of the connection electrode 3, or the like.

The following illustrations will be made by taking an example where the threaded hole 31 is distributed at the bottom of the slide slot 30 of the connection electrode 3.

Exemplarily, as shown in FIG. 7, the threaded hole 31 is disposed at the bottom of the slide slot 30; the slider 51 is provided with a through hole 51a; and the battery compartment cover 4 is connected to the connection electrode 3 by the screw 6 passing through the through hole 51a. That is, the battery compartment cover 4 is connected to the connection electrode 3 by screwing the screw 6 to the threaded hole 31.

The through hole 51a is in the middle of the slider 51, and the first magnetic member 53 is a magnet. In order to drive the slider 51 with a more smooth magnetic force, the first magnetic member 53 may be located in the middle of the bottom of the slide slot 30. In addition, in order to facilitate the connection of the screw 6 to the threaded hole 31 of the connection electrode 3 by passing through the through hole 51a in the middle of the slider 51, the through hole 51a may be provided in the middle of the magnet, such that the screw 6 may pass through the through hole 51a of the magnet to engage with the threaded hole 31 at the bottom of the slide slot 30. Moreover, after the screw 6 is screwed tightly into the threaded hole 31, the battery compartment cover 4 may abut against the slider 51 and push the second magnetic member 54 to approach the first magnetic member 53.

It should be noted that the arrangement manners and numbers of the threaded holes in the slide slot as well as the structures of the screw in the embodiments as described above for an elastic pushing-out member can be applied to the battery compartment where the pushing-out member includes the first magnetic member and the second magnetic member, which is not repeated in this embodiment.

Figure 8:
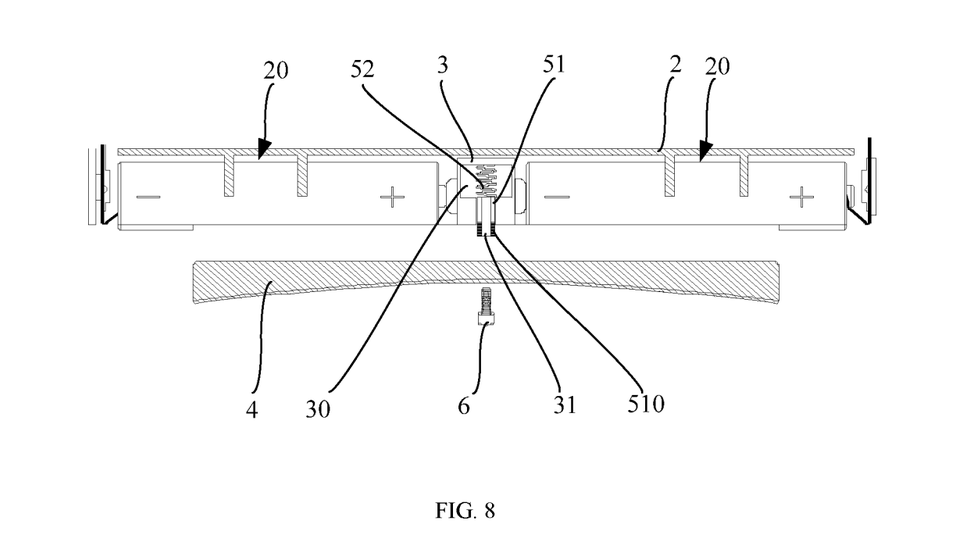
FIG. 8 is a schematic diagram of a structure of still another battery compartment according to an embodiment of the present disclosure.

FIG. 8 is a schematic diagram of a structure of still another battery compartment according to an embodiment of the present disclosure. The structures of the battery compartment shown in FIG. 8 and FIG. 1 are similar, and their difference merely lies in that the screw 6 of the battery compartment in FIG. 1 is directly threadedly engaged with the threaded hole 31 on the connection electrode 3, whereas the screw 6 of the battery compartment shown in FIG. 8 is threadedly engaged with the threaded hole 31 on the slider 51. Moreover, the slider 51 in FIG. 8 is further threadedly engaged with the slide slot 30 of the connection electrode 3. That is, the screw 6 in FIG. 8 is connected to the connection electrode 3 indirectly via the slider 51.

As shown in FIG. 8, the slide slot 30 is provided with an internal thread; one end of the slider 51 facing the battery mount 2 is slidably inserted into the slide slot 30, and the other end of the slider 51 facing away from the battery mount 2 is provided with an external thread 510 mating with the internal thread; the slider 51 is provided with a threaded hole 31; and the battery compartment cover 4 is fixed onto the slider 51 by the screw 6 engaged with the threaded hole 31. The friction coefficient of the thread between the slide slot 30 and the slider 51 is lower than the friction coefficient of the thread between the screw 6 and the threaded hole 31 of the slider 51.

When the battery compartment cover 4 is installed on the connection electrode 3, the slider 51 is firstly pushed by the battery compartment cover 4 to slide in the slide slot 30, such that the threaded section at the other end of the slider 51 contacts the internal thread section of the slide slot 30. At this point, the screw 6 is screwed into the threaded hole 31 of the slider 51 by passing through the battery compartment cover 4, and then the screw 6 is further screwed to drive the slider 51 to rotate relative to the slide slot 30, such that the slider 51 is screwed into the internal thread of the slide slot 30, thereby fixing the battery compartment cover 4 onto the connection electrode 3. Meanwhile, as the slider 51 is being screwed into the slide slot 30, the slider 51 would also compress the elastic member 52. Upon detaching the battery compartment cover 4 from the battery compartment, the screw 6 is firstly unscrewed. Since the friction coefficient between the slide slot 30 and the slider 51 is lower than the friction coefficient between the screw 6 and the threaded hole 31 of the slider 51, a relative rotation between the slider 51 and the slide slot 30 happens first during the process of unscrewing the screw 6, such that the slider 51 is loosened from the slide slot 30. At this point, the battery compartment cover 4 is ejected from the mounting groove by virtue of the elastic force of the elastic member 52, and then the screw 6 can be further unscrewed from the threaded hole 31 of the slider 51 to remove the battery compartment cover 4.

In order to make the friction coefficient between the slide slot 30 and the slider 51 smaller than the friction coefficient between the screw 6 and the threaded hole 31 of the slider 51, exemplarily, a lubricating fluid, such as lubricating oil, may be provided between the slide slot 30 and the slider 51. Exemplarily, the slot surface of the internal thread of the slide slot 30 may be polished more smoothly, such that the slider 51 can rotate more easily in the slide slot 30.

Exemplarily, as the larger the profile angle of the thread is, the lower the friction coefficient thereof is, the profile angle of the thread for engagement between the slide slot 30 and the slider 51 can be configured to be larger than the profile angle of the thread for engagement between the screw 6 and the slider 51, so as to achieve the purpose that the friction coefficient between the slide slot 30 and the slider 51 is smaller than the friction coefficient between the screw 6 and the threaded hole 31 of the slider 51.

In some implementations of the embodiment of the present disclosure, a threaded rod of the screw 6 in the battery compartment shown in FIG. 1 and FIGS. 4 to 8 may, for example, be a straight rod with a constant diameter, and the screw 6 is threadedly coupled to the threaded hole 31 in the connection electrode 3 by the screw rod to fix the battery compartment cover 4 onto the connection electrode 3. When the screw 6 is unscrewed from the threaded hole 31, the threaded rod of the screw 6 is pulled out of the battery compartment cover 4, and then the battery compartment cover 4 is ejected by virtue of the force provided by the pushing-out member.

In some implementations of the embodiment of the present disclosure, the threaded rod of the screw 6 may be a threaded rod with a variable diameter.

Figure 9:
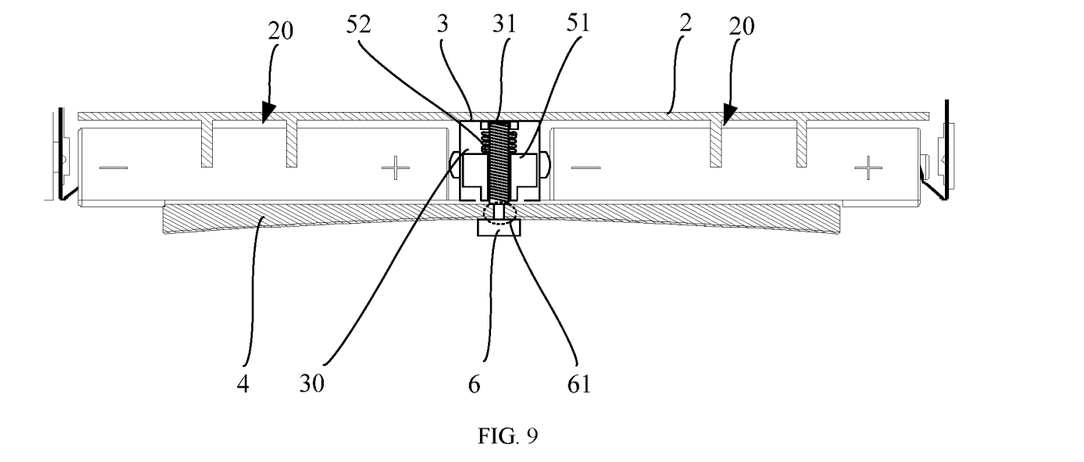
FIG. 9 is a schematic diagram of a structure of still another battery compartment according to an embodiment of the present disclosure.

FIG. 9 is a schematic diagram of a structure of still another battery compartment according to an embodiment of the present disclosure. As shown in FIG. 9, the threaded rod of the screw 6 has a narrow portion 61 with a reduced diameter. The narrow portion 61 is in the middle portion of the threaded rod and is contained in a mounting hole 40 of the battery compartment cover 4 which is configured for the screw 6 to pass through, and a diameter of the mounting hole 40 is smaller than a diameter of the threaded rod. As the diameter of the mounting hole 40 is smaller than the diameter of the threaded rod, and the narrow portion 61 of the screw 6 is installed in the mounting hole 40, the battery compartment cover 4 can be driven to move along with the movement of the screw 6. In this embodiment, after entering the threaded hole 31 of the battery compartment cover 4, the screw 6 sequentially passes through the through hole 51a in the slider 51 and the through hole 51a of the spring, and is finally threadedly coupled to the threaded hole 31 at the bottom of the slide slot 30. When the battery compartment cover 4 is to be detached, the screw 6 will be unscrewed from the threaded hole 31 first, and during the process of unscrewing the screw 6, as the connection electrode 3 is fixed onto the battery mount 2, the screw 6 may slowly drop off from the threaded hole 31, and during this process, the battery compartment cover 4 will be driven to move. As the moving process involves a rigid contact, in this case, even if the battery compartment cover 4 or the mounting groove are deformed due to factors such as aging or heating of the materials and the battery compartment cover 4 and the mounting groove are clamped too tightly resulted from the deformation, the screw 6 can still drive the battery compartment cover 4 to move a certain distance to thereby realize the purpose of pre-loosening the battery compartment cover 4. After the battery compartment cover 4 and the mounting groove are loosened, the battery compartment cover 4 can be ejected from the mounting groove by virtue of the elastic force of the spring, thereby realizing the purpose of quickly removing the battery compartment cover 4.

In this embodiment, when the threaded rod of the screw 6 is a straight rod with a constant diameter, the battery compartment cover installed with such straight rod may a structure formed integrally. As shown in FIG. 1 and FIGS. 4 to 8, the battery compartment cover may be of an integrated structure, and the battery compartment cover can be connected to the connection electrode by only making the screw 6 to pass through the mounting hole of the battery compartment cover and then engage with the threaded hole.

Figure 10:
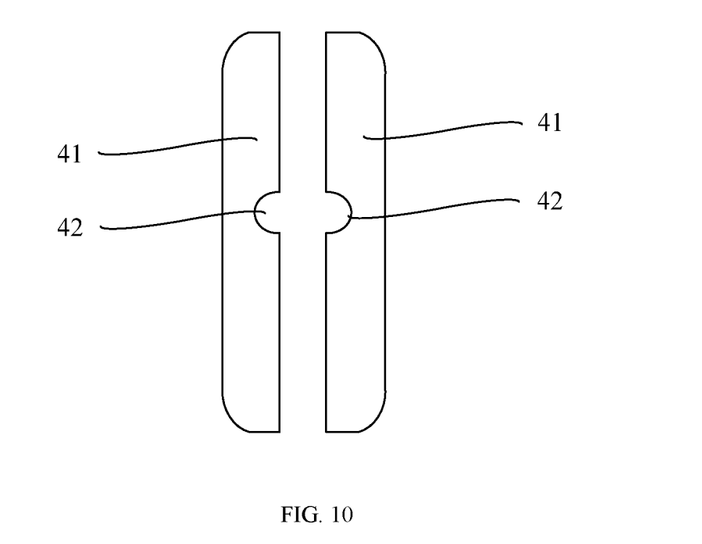
FIG. 10 is a schematic diagram of a structure of a battery compartment cover according to an embodiment of the present disclosure.

Regarding the implementations where the threaded rod of the screw 6 is a threaded rod with a variable diameter, FIG. 10 is a schematic diagram of a structure of a battery compartment cover according to an embodiment of the present disclosure. As shown in FIG. 10, the battery compartment cover 4 may include two separate cover plates 41 each having a recess 42, and the mounting hole 40 is formed from the two recesses when the two separate cover plates 41 are combined together. In this embodiment, as shown in FIG. 10, the recesses 42 of the two separate cover plates 41 may both be semi-circular recesses having a same diameter with the narrow portion 61, such that the narrow portion 61 of the screw 6 can be clamped by the two recesses 42 when the two separate cover plates 41 are combined together, and the battery compartment cover 4 can be ejected by the screw 6 under the push of the screw 6.

The embodiments of the present disclosure further provide a handle for use in a transportation vehicle, and the handle is particularly suitable for use in the public transportation vehicles.

Figure 11:
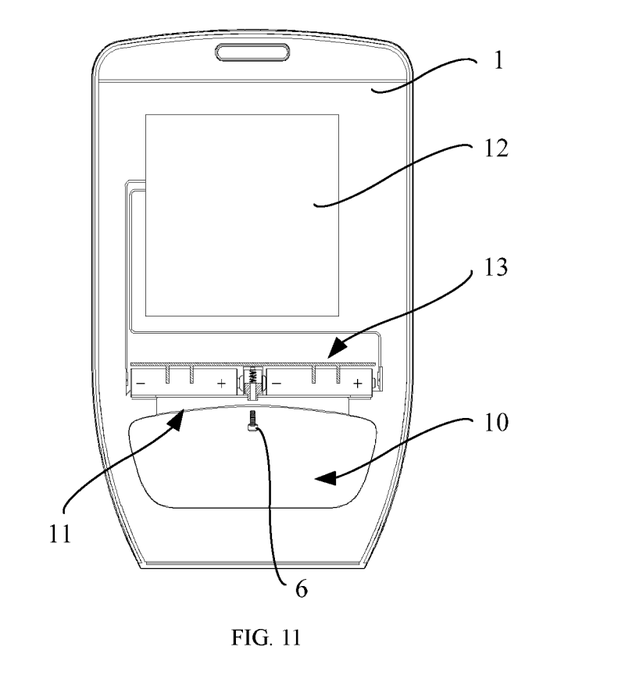
FIG. 11 is a schematic diagram of a structure of a handle according to an embodiment of the present disclosure.

FIG. 11 is a schematic diagram of a structure of a handle according to an embodiment of the present disclosure. As shown in FIG. 11, the handle includes the aforesaid battery compartment 13.

Figure 12:
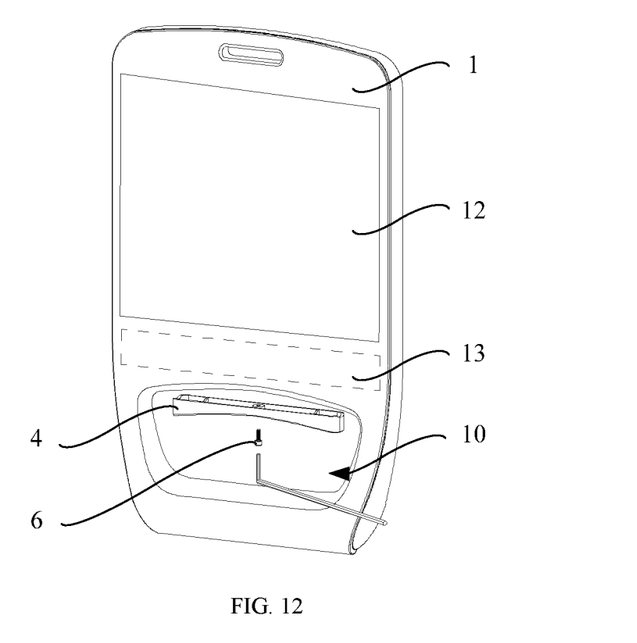
FIG. 12 is a schematic diagram of a structure of another handle according to an embodiment of the present disclosure.

FIG. 12 is a schematic diagram of a structure of another handle according to an embodiment of the present disclosure. As shown in conjunction with FIG. 11 and FIG. 12, the battery compartment cover 4 is connected to the connection electrode 3 by the screw 6, so as to fix the battery compartment cover 4 within a mounting slot 11.

Figure 13:
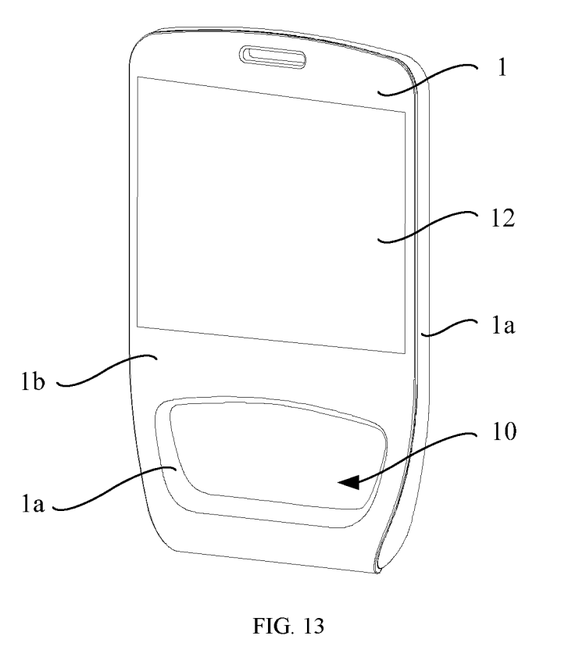
FIG. 13 is a schematic diagram of a structure of still another handle according to an embodiment of the present disclosure.

FIG. 13 is a schematic diagram of a structure of still another handle according to an embodiment of the present disclosure. As shown in FIG. 13, the handle has a casing 1 in a flat plate shape, wherein the casing 1 includes a side connection plate 1a and two flat plates 1b facing each other in parallel. Each of the two flat plates 1b is provided with a grip hole 10, and the side connection plate 1a is configured to connect outer edges of the two flat plates 1b and connect inner edges of the two grip holes 10.

As shown in FIG. 11, FIG. 12 and FIG. 13, the mounting slot 11 penetrates the side connection plate 1a that is connected to inner edges of the two grip holes 10. That is, when the battery compartment cover 4 is installed into the mounting slot 11, the battery compartment cover 4 enters into the mounting slot 11 from the side of the side connection plate 1a connected to the inner edge of the grip hole 10.

As shown in FIG. 11, FIG. 12 and FIG. 13, the handle further includes a display screen 12, wherein at least one of the two flat plates 1b is provided with the display screen 12, and the display screen 12 is electrically connected to the battery compartment. The display screen 12 may be an electronic ink screen. In addition, each of the two flat plates 1b may be provided with an electronic ink screen to ensure that the handle has a good display effect.

In this embodiment, the display screen 12 may be installed in the middle of the flat plate 1b, and the grip hole 10 may be provided at the side edges of the flat plate 1b, which can spare a larger space for accommodating the battery compartment 13. As shown in FIG. 11 and FIG. 12, as to the space inside the casing 1, the space between the display screen 12 and the grip hole 10 is configured to accommodate the battery compartment 13. In addition, the battery compartment 13 directly faces the mounting slot 11 provided in the side connection plate 1a connected to the inner edges of the grip hole 10, such that the battery compartment cover 4 is located in the mounting slot 11 when the battery compartment is covered by the battery compartment cover 4.

Figure 14:
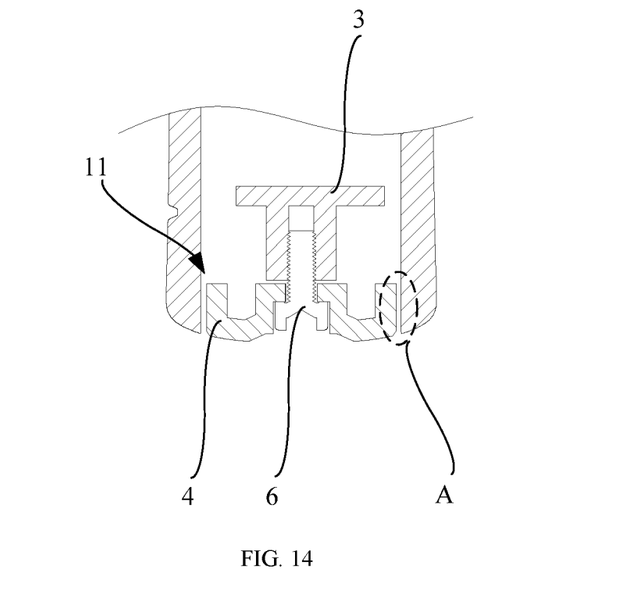
FIG. 14 is a schematic diagram of a sectional structure of a battery compartment according to an embodiment of the present disclosure.

FIG. 14 is a schematic diagram of a sectional structure of a battery compartment according to an embodiment of the present disclosure. As shown in FIG. 14, a certain gap A is generally reserved between the mounting slot 11 and the battery compartment cover 4, which facilitates the installation of the battery compartment cover 4 in the mounting slot 11, or facilitates rapid dropping of the battery compartment cover 4 from the mounting slot 11 by gravity.

Figure 15:
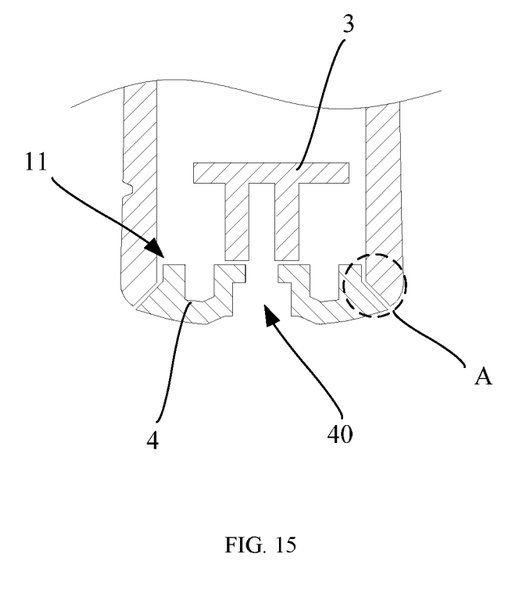
FIG. 15 is a schematic diagram of a sectional structure of another battery compartment according to an embodiment of the present disclosure.

FIG. 15 is a schematic diagram of a sectional structure of another battery compartment according to an embodiment of the present disclosure. As shown in FIG. 15, the handle includes a casing 1 provided with a mounting slot 11. The battery mount 2 is in the mounting slot, the battery compartment cover 4 fits into an opening of the mounting slot 11, and a surface where the battery compartment cover 4 fits into the opening of the mounting slot 11 is an inclined surface.

In the handle shown in FIG. 14, the surface where the battery compartment cover 4 fits into the opening of the mounting slot 11 is a flat surface, thus, a vertical gap A is formed between the battery compartment cover 4 and the mounting slot 11, and due to the influence of the processing precision, it is hard to ensure that the gap A is made to be have the set size as required. When the gap A is too small, the battery compartment cover 4 may be stuck in the mounting slot 11 after the battery compartment cover 4 is installed in the mounting slot 11, such that the battery compartment cover 4 cannot be easily detached; when the gap A is too large, after the battery compartment cover 4 is installed in the mounting slot 11, a person may observe the internal structure of the casing 1 of the handle through the vertical gap A, and the dust may easily enter.

In the handle shown in FIG. 15, the surface where the battery compartment cover 4 fits into the opening of the mounting slot 11 is adjusted to be an inclined surface, such that the gap A is changed from a vertical gap to an inclined gap. Thus, it is not easy to observe the internal structure of the handle from below, and the friction between the mounting slot 11 and the battery compartment cover 4 gets smaller while removing the battery compartment cover 4, which makes it easier to remove the battery compartment cover 4.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A battery compartment, comprising:
  a battery mount having at least two battery mounting grooves spaced apart from each other;
  a connection electrode on the battery mount and between adjacent battery mounting grooves;
  a battery compartment cover detachably connected to the connection electrode; and
  a pushing-out assembly on the connection electrode, wherein the pushing-out assembly is configured to provide a force for moving the battery compartment cover away from the connection electrode;
  wherein the connection electrode is provided with a slide slot, the pushing-out assembly comprises a pushing-out member in the slide slot and a slider configured to slidably engage with the slide slot, wherein the pushing-out member is configured to provide a force for moving the slider away from a bottom of the slide slot, so as to enable at least a portion of the slider to extend out of the slide slot; and the connection electrode is cylindrical and has a closed end and an open end opposite to each other, wherein the closed end is located on the battery mount and the open end faces the battery compartment cover, and an inner cavity of the connection electrode constitutes the slide slot.

2. The battery compartment according to claim 1, wherein the pushing-out member is an elastic member, and the elastic member is located between the bottom of the slide slot and the slider.

3. The battery compartment according to claim 1, wherein the pushing-out member comprises a first magnetic member at the bottom of the slide slot and a second magnetic member on the slider, wherein magnetic poles of the first magnetic member and the second magnetic member facing each other have a same polarity.

4. The battery compartment according to claim 1, wherein an inner wall of the slide slot is provided with internal threads; an end of the slider proximal to the battery mount is slidably inserted into the slide slot, and an end of the slider distal from the battery mount is provided with external threads mating with the internal threads; and the slider is provided with a threaded hole, and the battery compartment cover is fixed onto the slider by a screw engaged with the threaded hole.

5. The battery compartment according to claim 1, wherein a slider stopper plate is provided at the open end of the connection electrode.

6. The battery compartment according to claim 1, wherein the pushing-out member is a spring with one end abutting against the bottom of the slide slot and another end abutting against the slider;

the connection electrode is cylindrical and has a closed end and an open end opposite to each other, wherein the closed end is located on the battery mount and the open end faces the battery compartment cover, an inner cavity of the connection electrode constitutes the slide slot, and a slider stopper plate is provided at the open end of the connection electrode;

the slider comprises a body and a protrusion protruding axially from a side surface of the body, wherein the body is inside the slide slot, and the protrusion is outside the slide slot and axially extends out of the slider stopper plate; and a threaded hole is provided in a middle of the bottom of the slide slot; the slider is provided with a through hole coaxial with the threaded hole; the battery compartment cover is detachably connected to the connection electrode by a screw engaged with the threaded hole; and the screw sequentially passes through the through hole of the slider and the through hole of the spring to engage with the threaded hole.

7. The battery compartment according to claim 1, wherein the connection electrode is provided with a threaded hole, and the battery compartment cover is detachably connected to the connection electrode by a screw engaged with the threaded hole.

8. The battery compartment according to claim 7, wherein the threaded hole is at the bottom of the slide slot, the slider is provided with a through hole coaxial with the threaded hole, and the screw passes through the through hole to engage with the threaded hole at the bottom of the slide slot.

9. The battery compartment according to claim 7, wherein a narrow portion having a reduced diameter is in a middle portion of a threaded rod of the screw, wherein the narrow portion is contained in a mounting hole of the battery compartment cover which is configured for the screw to pass through, and a diameter of the mounting hole is smaller than a diameter of the threaded rod.

10. The battery compartment according to claim 9, wherein the battery compartment cover comprises two separate cover plates, wherein each of the two separate cover plates is provided with a recess, and the mounting hole is formed from the two recesses when the two separate cover plates are combined.

11. The battery compartment according to claim 7, wherein the threaded hole is in an end surface of the connection electrode, wherein the end surface is a surface of the connection electrode facing away from the battery mount.

12. The battery compartment according to claim 11, wherein the threaded hole is a through hole, and the screw passes through the threaded hole to abut against the slider.

13. The battery compartment according to claim 11, wherein the threaded hole is a blind hole.

14. A handle for use in a transportation vehicle, comprising a battery compartment, wherein the battery compartment comprises:

a battery mount having at least two battery mounting grooves spaced apart from each other;

a connection electrode on the battery mount and between adjacent battery mounting grooves;

a battery compartment cover detachably connected to the connection electrode; and a pushing-out assembly on the connection electrode, wherein the pushing-out assembly is configured to provide a force for moving the battery compartment cover away from the connection electrode;

wherein the connection electrode is provided with a slide slot, the pushing-out assembly comprises a pushing-out member in the slide slot and a slider configured to slidably engage with the slide slot, wherein the pushing-out member is configured to provide a force for moving the slider away from a bottom of the slide slot, so as to enable at least a portion of the slider to extend out of the slide slot; and the connection electrode is cylindrical and has a closed end and an open end opposite to each other, wherein the closed end is located on the battery mount and the open end faces the battery compartment cover, and an inner cavity of the connection electrode constitutes the slide slot.

15. The handle according to claim 14, comprising: a casing provided with a mounting slot, wherein the battery mount is located in the mounting slot, the battery compartment cover fits into an opening of the mounting slot, and a surface where the battery compartment cover fits into the opening of the mounting slot is an inclined surface.

16. The handle according to claim 15, wherein the casing comprises a side connection plate and two flat plates facing each other in parallel, wherein each of the two flat plates is provided with a grip hole, and the side connection plate is configured to connect outer edges of the two flat plates and connect inner edges of the two grip holes.

17. The handle according to claim 16, wherein the mounting slot penetrates the side connection plate connected to the inner edges of the two grip holes.

18. The handle according to claim 16, further comprising a display screen, wherein at least one of the two flat plates is provided with the display screen, and the display screen is electrically connected to the battery compartment.

19. A battery compartment, comprising:
- a battery mount having at least two battery mounting grooves spaced apart from each other;
- a connection electrode on the battery mount and between adjacent battery mounting grooves;
- a battery compartment cover detachably connected to the connection electrode; and
- a pushing-out assembly on the connection electrode, wherein the pushing-out assembly is configured to provide a force for moving the battery compartment cover away from the connection electrode;
- wherein the connection electrode is provided with a slide slot, the pushing-out assembly comprises a pushing-out member in the slide slot and a slider configured to slidably engage with the slide slot, wherein the pushing-out member is configured to provide a force for moving the slider away from a bottom of the slide slot, so as to enable at least a portion of the slider to extend out of the slide slot; and
- the connection electrode is provided with a threaded hole, and the battery compartment cover is detachably connected to the connection electrode by a screw engaged with the threaded hole.

* * * * *